US012681528B2

(12) United States Patent
Kim et al.

(10) Patent No.: US 12,681,528 B2
(45) Date of Patent: Jul. 14, 2026

(54) DISPLAY DEVICE

(71) Applicant: LG ELECTRONICS INC., Seoul (KR)

(72) Inventors: Chulki Kim, Seoul (KR); Jaehun Lee, Seoul (KR); Seunggyu Kang, Seoul (KR); Jonggil Pyo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/707,539

(22) PCT Filed: Nov. 4, 2021

(86) PCT No.: PCT/KR2021/015885
§ 371 (c)(1),
(2) Date: May 3, 2024

(87) PCT Pub. No.: WO2023/080270
PCT Pub. Date: May 11, 2023

(65) Prior Publication Data
US 2025/0028353 A1     Jan. 23, 2025

(51) Int. Cl.
*G06F 1/16*          (2006.01)
*G09F 9/30*          (2006.01)

(52) U.S. Cl.
CPC .............. *G06F 1/1607* (2013.01); *G06F 1/16* (2013.01); *G06F 1/1601* (2013.01); *G09F 9/30* (2013.01)

(58) Field of Classification Search
CPC ........ G06F 1/16; G06F 1/1601; G06F 1/1607; G06F 1/1637; G06F 1/1641;
(Continued)

(56) References Cited

U.S. PATENT DOCUMENTS

| | | | | | |
|---|---|---|---|---|---|
| 5,666,261 A | * | 9/1997 | Aguilera | ................... | B32B 7/12 |
| | | | | | 428/116 |
| 6,744,186 B2 | * | 6/2004 | Oishi | ................. | H05K 7/20963 |
| | | | | | 313/493 |

(Continued)

FOREIGN PATENT DOCUMENTS

| | | |
|---|---|---|
| KR | 101677743 | 11/2016 |
| KR | 1020160139832 | 12/2016 |

(Continued)

OTHER PUBLICATIONS

PCT International Application No. PCT/KR2021/015885, International Search Report dated Jul. 6, 2022, 12 pages.
(Continued)

*Primary Examiner* — Gage Crum
(74) *Attorney, Agent, or Firm* — LEE, HONG, DEGERMAN, KANG & WAIMEY

(57) ABSTRACT

A display device comprises: a display module that outputs an image; a drive IC positioned at the rear surface of one end of the display module; an inner sheet disposed on the rear surface of the display module to form a first gap; a cover bottom disposed on the rear surface of the inner sheet to form a second gap; and a middle cabinet that covers the circumferences of the display module, the inner sheet, and the cover bottom and forms a side exterior, wherein the inner sheet includes: a first region protruding in a direction toward the rear surface at a position corresponding to the drive IC; and a plurality of holes formed in the first region, wherein the holes extend vertically and are spaced apart from each other in a horizontal direction. The display device can be used in a form desired by a user since the display module can be transformed into a flat state or a bent state.

15 Claims, 11 Drawing Sheets

(58) Field of Classification Search
CPC .... G06F 1/1652; G06F 1/1658; G06F 1/1683;
G06F 1/18; G06F 1/183; G06F 1/184;
G06F 1/185; H05K 5/0247; H05K
5/0026; H05K 5/02; H05K 7/02; G02F
1/133305; G02F 1/133308; G02F
1/133314; G02F 1/133317; G02F
1/13332; G02F 1/13452; G09F 9/30;
G09F 9/301
USPC .................................................. 361/679.01
See application file for complete search history.

(56) References Cited

U.S. PATENT DOCUMENTS

| | | | | |
|---|---|---|---|---|
| 6,847,415 | B1 * | 1/2005 | Yoshimura | G02F 1/13452 349/149 |
| 7,218,521 | B2 * | 5/2007 | Kim | H05K 7/20 345/905 |
| 7,944,520 | B2 * | 5/2011 | Ichioka | G02F 1/133308 361/644 |
| 8,382,361 | B2 * | 2/2013 | Park | G02B 6/009 174/254 |
| 9,854,693 | B2 | 12/2017 | Seo et al. | |
| 2004/0160422 | A1 * | 8/2004 | Choi | G06F 1/1601 345/173 |
| 2005/0286228 | A1 * | 12/2005 | Kim | H05K 7/20963 361/704 |
| 2006/0012962 | A1 * | 1/2006 | Obata | H05K 5/02 345/60 |
| 2006/0132946 | A1 * | 6/2006 | Kim | H01J 11/10 359/885 |
| 2006/0198089 | A1 * | 9/2006 | Cho | H05K 5/02 345/37 |
| 2007/0228917 | A1 * | 10/2007 | Kiowa | H05K 5/02 313/238 |
| 2008/0055518 | A1 * | 3/2008 | Jung | G02B 6/0055 349/67 |
| 2013/0170156 | A1 * | 7/2013 | Jung | H10K 50/84 361/749 |
| 2013/0314638 | A1 * | 11/2013 | Ahn | G02F 1/133308 349/58 |
| 2014/0247566 | A1 * | 9/2014 | Lee | G09F 13/04 361/749 |
| 2014/0334100 | A1 * | 11/2014 | Yoon | G06F 1/20 361/748 |
| 2015/0316810 | A1 * | 11/2015 | Shibahara | G02F 1/133382 349/150 |
| 2015/0340646 | A1 * | 11/2015 | Shin | H10K 50/84 257/40 |
| 2016/0349568 | A1 * | 12/2016 | Oh | G02B 6/0088 |
| 2018/0017827 | A1 * | 1/2018 | Kil | G02B 6/009 |
| 2018/0269808 | A1 * | 9/2018 | Park | H04R 1/22 |
| 2018/0329254 | A1 * | 11/2018 | Wang | H10K 59/8722 |
| 2019/0327842 | A1 * | 10/2019 | Ryu | G06F 1/1656 |
| 2020/0053874 | A1 * | 2/2020 | Eom | H05K 3/30 |
| 2020/0201107 | A1 * | 6/2020 | Takaira | G02B 6/0088 |
| 2020/0205320 | A1 * | 6/2020 | Kong | H05K 7/20963 |
| 2021/0041621 | A1 * | 2/2021 | Yamashita | G02B 6/0083 |
| 2021/0127531 | A1 * | 4/2021 | Kazama | G06F 1/182 |
| 2021/0208448 | A1 * | 7/2021 | Kim | G02F 1/133317 |
| 2022/0104362 | A1 * | 3/2022 | Lee | H05K 5/0017 |
| 2022/0342255 | A1 * | 10/2022 | Kang | G06F 1/1601 |
| 2023/0127432 | A1 * | 4/2023 | Huang | G06F 1/1637 361/679.27 |
| 2024/0219623 | A1 * | 7/2024 | Guo | G02F 1/133317 |

FOREIGN PATENT DOCUMENTS

| | | |
|---|---|---|
| KR | 1020180024713 | 3/2018 |
| KR | 1020200020407 | 2/2020 |
| KR | 1020210087251 | 7/2021 |

OTHER PUBLICATIONS

European Patent Office Application Serial No. 21963370.8, Search Report dated Dec. 10, 2024, 9 pages.

* cited by examiner (a)

DISPLAY DEVICE

CROSS-REFERENCE TO RELATED APPLICATION(S)

This application is the National Stage filing under 35 U.S.C. 371 of International Application No. PCT/KR2021/015885, filed on Nov. 4, 2021, the contents of which are all incorporated by reference herein in its entirety.

TECHNICAL FIELD

The present disclosure relates to a display device with a variable curved structure for improving sense of immersion of a user.

BACKGROUND

With growth of information society, demand for various display devices has increased. In order to satisfy such demand, in recent years, a liquid crystal display (LCD), a field emission display (FED), a plasma display panel (PDP), and an electroluminescent device have been developed as display devices.

A liquid crystal panel of the liquid crystal display includes a liquid crystal layer and a TFT substrate and a color filter substrate opposite each other in the state in which the liquid crystal layer is interposed therebetween, wherein a picture is displayed using light provided from a backlight unit.

An active matrix type organic light-emitting display has come onto the market as an example of the electroluminescent device. Since the organic light-emitting display is self-emissive, the organic light-emitting display has no backlight, compared to the liquid crystal display, and has merits in terms of response time and viewing angle, and therefore the organic light-emitting display has attracted attention as a next-generation display.

The organic light emitting display device does not have a backlight, and thus it may be possible to bend and deform a display module to implement a curved display module. However, the curved display module may increase sense of immersion, but when multiple people watch, it may be more convenient to watch a video if the curved display module is spread out flat. There is a problem of taking up a space when not in use.

DISCLOSURE

Technical Problem

An embodiment of the present disclosure is to provide a display device with a changeable curvature.

Technical Solution

The present disclosure provides a display device including a display module configured to output an image, a drive integrated circuit (IC) located on a rear surface of one end of the display module, an inner sheet located to form a first gap on the rear surface of the display module, a cover bottom located to form a second gap on a rear surface of the inner sheet, and a middle cabinet covering perimeters of the display module, the inner sheet, and the cover bottom to form a lateral outer appearance, wherein the inner sheet includes a first region protruding toward a rear surface at a position corresponding to the drive IC, and a plurality of holes formed in the first region, and the holes extend long in a vertical direction and spaced apart from each other in a horizontal direction.

The first gap may be smaller than the second gap.

The vent hole may be formed long in the vertical direction.

The inner sheet may include a second region located in a central portion in the horizontal direction, and a plurality of rigid beads formed in the second region, extending in the horizontal direction, and arranged in parallel to each other.

The inner sheet may further include a third region located between the second region and an end in the horizontal direction, and a plurality of second holes formed in the third region.

The middle cabinet may include an exposed portion exposed around a lateral surface, and a fastener extending inward from the exposed portion and including a first hook, and the inner sheet may have an end including a second hook coupled to the first hook.

The inner sheet may include a plurality of slits formed in the end, the middle cabinet may include an exposed portion exposed around a lateral surface and a fastener extending between the display module and the inner sheet from the exposed portion, and the display device may further include an adhesive tape located in the slit and configured to fasten the fastener to the cover bottom.

The middle cabinet may include an exposed portion exposed around a lateral surface, and a fastener extending inward from the exposed portion, and the fastener may be located between the inner sheet and the cover bottom.

A front surface of the fastener may be coupled to the rear surface of the inner sheet by using an adhesive tape, and a rear surface of the fastener may be coupled to a front surface of the cover bottom by using an adhesive tape.

The middle cabinet may further include a third hook extending from an end of a rear surface of the exposed portion and covering an end of the cover bottom, and the cover bottom may further include a hook fastener inserted in a front direction at a position corresponding to the third hook.

The cover bottom may include a flat surface without an unevenness.

The middle cabinet may include an injection molding, and the cover bottom and the inner sheet may include aluminum.

The display device may further include a bending module located in a center of a rear surface of the cover bottom, a pair of links having one end coupled to the bending module and extending left and right, and link brackets located at left and right ends of the cover bottom and connected to another end of the link, and when an angle between the pair of links is changed, curvatures of the display module, the inner sheet, and the cover bottom may be changed.

The display module may include an organic light emitting diode panel.

Advantageous Effects

In a display device according to the present disclosure, a display module may be deformed into a flat state or a bent state, and thus a user may use the display device in a desired form.

A display device according to the present disclosure may include an inner sheet to be bendable and may be effective in terms of heat dissipation while ensuring rigidity.

Effects obtainable from the present disclosure may be non-limited by the above-mentioned effects. And, other unmentioned effects can be clearly understood from the following description by those having ordinary skill in the technical field to which the present disclosure pertains.

BRIEF DESCRIPTION OF THE DRAWINGS

FIG. 5 is a plan view of a display device viewed from the above.

FIG. 6 is an exploded perspective view of a main body of a display device.

BEST MODE

Figure 1:
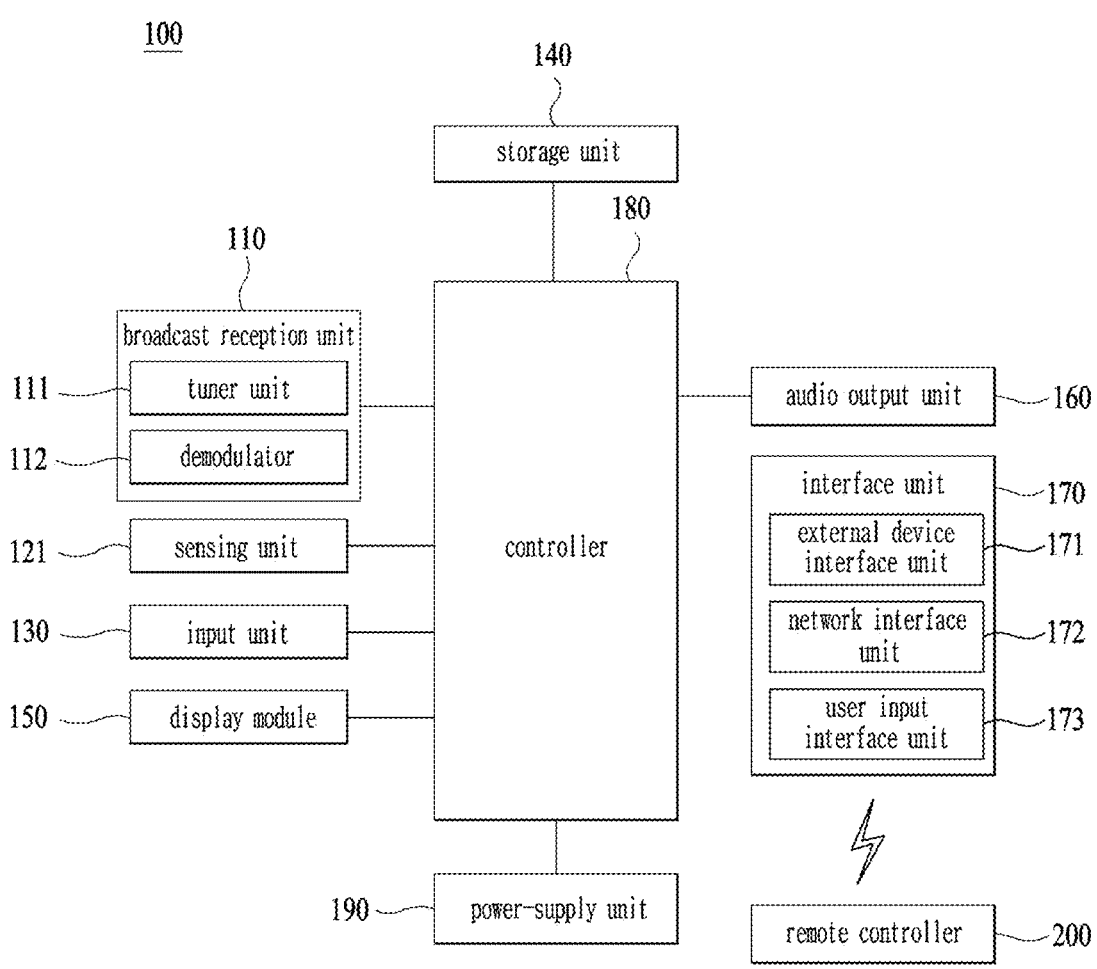
FIG. 1 is a block diagram illustrating components of a display device according to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Meanwhile, an image display device described in this specification is, for example, an intelligent image display device having a computer supporting function in addition to a broadcast reception function, wherein an Internet function may be added while the broadcast reception function is devotedly performed, whereby an interface that is more conveniently used, such as a handwriting type input device, a touchscreen, or a space remote control, may be provided. In addition, the image display device may be connected to the Internet or a computer through support of a wired or wireless Internet function, whereby various functions, such as e-mail, web browsing, banking, or gaming, may be executed. For such various functions, a standardized general-purpose OS may be used.

In the image display device described in the present disclosure, therefore, various applications may be freely added or deleted, for example, on a general-purpose OS kernel, whereby various user friendly functions may be executed. More specifically, the image display device may be a network TV, an Hbb TV, or a smart TV, and is applicable to a smartphone depending on circumstances.

FIG. 1 is a block diagram illustrating components of a display device 100. The display device 100 may include a broadcast reception unit 110, an external device interface unit 171, a network interface unit 172, a storage unit 140, a user input interface unit 173, an input unit 130, a controller 180, a display module 150, an audio output unit 160, and/or a power supply unit 190.

The broadcast reception unit 110 may include a tuner unit 111 and a demodulation unit 112.

Unlike the figure, on the other hand, the display device 100 may include only the external device interface unit 171 and the network interface unit 172, among the broadcast reception unit 110, the external device interface unit 171, and the network interface unit 172. That is, the display device 100 may not include the broadcast reception unit 110.

The tuner unit 111 may select a broadcast signal corresponding to a channel selected by a user or any one of all pre-stored channels, among broadcast signals received through an antenna (not shown) or a cable (not shown). The tuner unit 111 may convert the selected broadcast signal into an intermediate frequency signal or a baseband video or audio signal.

For example, when the selected broadcast signal is a digital broadcast signal, the tuner unit 111 may convert the broadcast signal into a digital IF (DIF) signal, and when the selected broadcast signal is an analog broadcast signal, the tuner unit 111 may convert the broadcast signal into an analog baseband video or audio (CVBS/SIF) signal. That is, the tuner unit 111 may process the digital broadcast signal or the analog broadcast signal. The analog baseband video or audio (CVBS/SIF) signal output from the tuner unit 111 may be directly input to the controller 180.

Meanwhile, the tuner unit 111 may sequentially select broadcast signals of all broadcast channels stored through a channel memory function, among received broadcast signals, and may convert each of the selected broadcast signals into an intermediate frequency signal or a baseband video or audio signal.

Meanwhile, the tuner unit 111 may include a plurality of tuners in order to receive broadcast signals of a plurality of channels. Alternatively, a single tuner may simultaneously receive broadcast signals of a plurality of channels.

The demodulation unit 112 may receive the digital IF (DIF) signal converted by the tuner unit 111, and may perform demodulation. After performing demodulation and channel decryption, the demodulation unit 112 may output a stream signal (TS). At this time, the stream signal may be a multiplexed image, audio, or data signal.

The stream signal output from the demodulation unit 112 may be input to the controller 180. After performing demultiplexing and image/audio signal processing, the controller 180 may output an image through the display module 150, and may output audio through the audio output unit 160.

The sensing unit 120 is a device configured to sense change inside or outside the display device 100. For example, the sensing unit 120 may include at least one of a proximity sensor, an illumination sensor, a touch sensor, an infrared (IR) sensor, an ultrasonic sensor, an optical sensor (e.g. a camera), an audio sensor (e.g. a microphone), a battery gauge, and an environmental sensor (e.g. a hygrometer or a thermometer).

The controller 180 may check the state of the display device 100 based on information collected by the sensing unit, and when a problem occurs, may inform a user of the same or may solve the problem, whereby the controller may perform control such that the display device is maintained in the best state.

In addition, the controller may differently control the content, quality, and size of an image provided to the display module 150 based on a viewer or ambient light sensed by the sensing unit in order to provide the optimum viewing environment. With progress of a smart TV, a large number of functions have been loaded in the display device, and the sensing unit 20 has also been increased in number.

The input unit 130 may be provided at one side of a main body of the display device 100. For example, the input unit 130 may include a touchpad or a physical button. The input unit 130 may receive various user commands related to the operation of the display device 100, and may transmit control signals corresponding to the received commands to the controller 180.

With a decrease in size of a bezel of the display device 100, many display devices 100 have been configured such that the number of physical button type input units 130 exposed to the outside is minimized in recent years. Instead, a minimum number of physical buttons is located at the rear surface or the side surface of the display device, and the display device may receive user input through the touchpad or the user input interface unit 173, a description of which will follow, using a remote controller 200.

The storage unit 140 may store programs for signal processing and control in the controller 180, and may store a processed image, audio, or data signal. For example, the storage unit 140 may store application programs designed to execute various tasks that can be processed by the controller 180, and may selectively provide some of the stored application programs in response to request of the controller 180.

Programs stored in the storage unit 140 are not particularly restricted as long as the programs can be executed by the controller 180. The storage unit 140 may temporarily store an image, audio, or data signal received from an external device through the external device interface unit 171. The storage unit 140 may store information about a predetermined broadcast channel through a channel memory function, such as a channel map.

FIG. 1 shows an embodiment in which the storage unit 140 and the controller 180 are separately provided; however, the present disclosure is not limited thereto. The storage unit 140 may be included in the controller 180.

The storage unit 140 may include at least one of a volatile memory (e.g. DRAM, SRAM, or SDRAM), a nonvolatile memory (e.g. flash memory), a hard disk drive (HDD), and a solid-state drive (SSD).

The display module 150 may convert an image signal, a data signal, an OSD signal, and a control signal processed by the controller 180 or an image signal, a data signal, and a control signal received from the interface unit 171 to generate a driving signal. The display module 150 may include a display panel 181 having a plurality of pixels.

Each of the plurality of pixels in the display panel may include RGB subpixels. Alternatively, each of the plurality of pixels in the display panel may include RGBW subpixels. The display module 150 may convert an image signal, a data signal, an OSD signal, and a control signal processed by the controller 180 to generate a driving signal for the plurality of pixels.

A plasma display panel (PDP), a liquid crystal display (LCD), an organic light-emitting diode (OLED), or a flexible display may be used as the display module 150, and a 3D display may also be used. The 3D display 130 may be classified as a non-glasses type display or a glasses type display.

The display device includes a display module, which occupies a major portion of the front surface thereof, and a case configured to cover the rear surface and the side surface of the display module, the case being configured to package the display module.

In recent years, the display device 100 has used a flexible display module 150, such as light-emitting diodes (LED) or organic light-emitting diodes (OLED), in order to implement a curved screen.

Light is supplied to an LCD, which was mainly used conventionally, through a backlight unit, since the LCD is not self-emissive. The backlight unit is a device that supplies light emitted from a light source to a liquid crystal uniformly located in front thereof. As the backlight unit has been gradually thinned, a thin LCD has been implemented. However, it is difficult to implement the backlight unit using a flexible material. If the backlight unit is curved, it is difficult to supply uniform light to the liquid crystal, whereby the brightness of a screen is changed.

In contrast, the LED or the OLED may be implemented so as to be curved, since an element constituting each pixel is self-emissive, and therefore no backlight unit is used. In addition, since each element is self-emissive, the brightness of the element is not affected even though the positional relationship between adjacent elements is changed, and therefore it is possible to implement a curved display module 150 using the LED or the OLED.

An organic light-emitting diode (OLED) panel appeared in earnest in mid 2010 and has rapidly replaced the LCD in the small- or medium-sized display market. The OLED is a display manufactured using a self-emissive phenomenon of an organic compound in which the organic compound emits light when current flows in the organic compound. The response time of the OLED is shorter than the response time of the LCD, and therefore afterimages hardly appear when video is implemented.

The OLED is an emissive display product that uses three fluorescent organic compounds having a self-emissive function, such as red, green, and blue fluorescent organic compounds and that uses a phenomenon in which electrons injected at a negative electrode and a positive electrode and particles having positive charges are combined in the organic compounds to emit light, and therefore a backlight unit, which deteriorates color, is not needed.

A light-emitting diode (LED) panel is based on technology of using one LED element as one pixel. Since it is possible to reduce the size of the LED element, compared to a conventional device, it is possible to implement a curved display module 150. The conventional device, which is called an LED TV, uses the LED as a light source of a backlight unit that supplies light to the LCD, and therefore the LED does not constitute a screen.

The display module includes a display panel and a coupling magnet, a first power supply unit, and a first signal module located at a rear surface of the display panel. The display panel may include a plurality of pixels R, G, and B. The plurality of pixels R, G, and B may be formed at intersections between a plurality of data lines and a plurality of gate lines. The plurality of pixels R, G, and B may be disposed or arranged in a matrix form.

For example, the plurality of pixels R, G, and B may include a red subpixel 'R', a green subpixel 'G', and a blue subpixel 'B'. The plurality of pixels R, G, and B may include a white subpixel 'W'.

The side of the display module 150 on which a picture is displayed may be referred to as a front side or a front surface. When the display module 150 displays the picture, the side of the display module 150 from which the picture cannot be viewed may be referred to as a rear side or a rear surface.

Meanwhile, the display module 150 may be constituted by a touchscreen, whereby an input device may also be used in addition to an output device.

The audio output unit 160 receives an audio signal processed by the controller 180 and outputs the same as audio.

The interface unit 170 serves as a path to various kinds of external devices connected to the display device 100. The interface unit may include a wireless system using an antenna as well as a wired system configured to transmit and receive data through a cable.

The interface unit 170 may include at least one of a wired/wireless headset port, an external charger port, a wired/wireless data port, a memory card port, a port for connection with a device having an identification module, an audio input/output (I/O) port, a video input/output (I/O) port, and an earphone port.

The broadcast reception unit 110 may be included as an example of the wireless system, and a mobile communication signal, a short-range communication signal, and a wireless Internet signal as well as a broadcast signal may be included.

The external device interface unit 171 may transmit or receive data to or from a connected external device. To this end, the external device interface unit 171 may include an A/V input and output unit (not shown).

The external device interface unit 171 may be connected to an external device, such as a digital versatile disc (DVD) player, a Blu-ray player, a game console, a camera, a camcorder, a computer (laptop computer), or a set-top box, in wired/wireless manner, and may perform input/output operation for the external device.

In addition, the external device interface unit 171 may establish a communication network with various remote controllers 200 in order to receive a control signal related to the operation of the display device 100 from each remote controller 200 or to transmit data related to the operation of the display device 100 to each remote controller 200.

The external device interface unit 171 may include a wireless communication unit (not shown) for short-range wireless communication with another electronic device. The external device interface unit 171 may exchange data with a mobile terminal adjacent thereto through the wireless communication unit (not shown). Particularly, in a mirroring mode, the external device interface unit 171 may receive device information, information of an application that is executed, and an image of the application from the mobile terminal.

The network interface unit 172 may provide an interface for connection of the display device 100 with a wired/wireless network including the Internet. For example, the network interface unit 172 may receive content or data provided by an Internet or content provider or a network operator through the network. Meanwhile, the network interface unit 172 may include a communication module (not shown) for connection with the wired/wireless network.

The external device interface unit 171 and/or the network interface unit 172 may include a communication module for short-range communication, such as Wi-Fi, Bluetooth, Bluetooth Low Energy (BLE), ZigBee, or Near Field Communication (NFC), or a communication module for cellular communication, such as Long-Term Evolution (LTE), LTE Advance (LTE-A), Code Division Multiple Access (CDMA), Wideband CDMA (WCDMA), Universal Mobile Telecommunications System (UMTS), or Wireless Broadband (WiBro).

The user input interface unit 173 may transmit a user input signal to the controller 180, or may transmit a signal from the controller 180 to a user. For example, the user input interface unit may transmit/receive a user input signal, such as power on/off, channel selection, or screen setting, to/from the remote controller 200, may transmit a user input signal, such as a power key, a channel key, a volume key, or a setting value, input from a local key (not shown) to the controller 180, may transmit a user input signal input from a sensor unit (not shown) configured to sense user gesture to the controller 180, or may transmit a signal from the controller 180 to the sensor unit.

The controller 180 may include at least one processor, and may control the overall operation of the display device 100 using the processor included therein. Here, the processor may be a general processor, such as a central processing unit (CPU). Of course, the processor may be a dedicated device, such as an ASIC, or another hardware-based processor.

The controller 180 may demultiplex a stream input through the tuner unit 111, the demodulation unit 112, the external device interface unit 171, or the network interface unit 172, or may process demultiplexed signals to generate and output a signal for image or audio output.

An image signal processed by the controller 180 may be input to the display module 150, which may display an image corresponding to the image signal. In addition, the image signal processed by the controller 180 may be input to an external output device through the external device interface unit 171.

An audio signal processed by the controller 180 may be output through the audio output unit 160. In addition, the audio signal processed by the controller 180 may be input to an external output device through the external device interface unit 171. Although not shown in FIG. 2, the controller 180 may include a demultiplexing unit and an image processing unit, which will be described below with reference to FIG. 3.

Further, the controller 180 may control the overall operation of the display device 100. For example, the controller 180 may control the tuner unit 111 such that a broadcast corresponding to a channel selected by a user or a pre-stored channel is tuned.

In addition, the controller 180 may control the display device 100 according to a user command input through the user input interface unit 173 or an internal program. Meanwhile, the controller 180 may control the display module 150 to display an image. At this time, the image displayed on the display module 150 may be a still image or video, or may be a 2D image or a 3D image.

Meanwhile, the controller 180 may perform control such that a predetermined 2D object is displayed in an image displayed on the display module 150. For example, the object may be at least one of a connected web screen (newspaper or magazine), an electronic program guide (EPG), various menus, a widget, an icon, a still image, video, and text.

Meanwhile, the controller 180 may modulate and/or demodulate a signal using an amplitude shift keying (ASK) method. Here, the amplitude shift keying (ASK) method may be a method of changing the amplitude of a carrier depending on a data value to modulate a signal or restoring an analog signal to a digital data value depending on the amplitude of a carrier.

For example, the controller 180 may modulate an image signal using the amplitude shift keying (ASK) method, and may transmit the modulated image signal through a wireless communication module.

For example, the controller 180 may demodulate and process an image signal received through the wireless communication module using the amplitude shift keying (ASK) method.

As a result, the display device 100 may easily transmit and receive a signal to and from another image display device disposed adjacent thereto without using a unique identifier, such as a media access control (MAC) address, or a complicated communication protocol, such as TCP/IP.

Meanwhile, the display device 100 may further include a photographing unit (not shown). The photographing unit may photograph a user. The photographing unit may be implemented by one camera; however, the present disclosure is not limited thereto. The photographing unit may be implemented by a plurality of cameras. Meanwhile, the photographing unit may be embedded in the display device 100 above the display module 150, or may be separately disposed. Image information photographed by the photographing unit may be input to the controller 180.

The controller 180 may recognize the location of a user based on an image captured by the photographing unit. For example, the controller 180 may recognize the distance between the user and the display device 100 (z-axis coordinate). Further, the controller 180 may recognize an x-axis coordinate and a y-axis coordinate in the display module 150 corresponding to the location of the user.

The controller 180 may sense user gesture based on the image captured by the photographing unit, a signal sensed by the sensor unit, or a combination thereof.

The power supply unit 190 may supply power to the components of the display device 100. In particular, the power supply unit may supply power to the controller 180, which may be implemented in the form of a system on chip (SOC), the display module 150 for image display, and the audio output unit 160 for audio output.

Specifically, the power supply unit 190 may include an AC/DC converter (not shown) configured to convert AC power into DC power and a DC/DC converter (not shown) configured to convert the level of the DC power.

Meanwhile, the power supply unit 190 serves to distribute power supplied from the outside to the respective components of the display device. The power supply unit 190 may be directly connected to an external power supply in order to supply AC power, or may include a battery so as to be used by charging.

In the former case, a cable is used, and the power supply unit is difficult to move or the movement range of the power supply unit is limited. In the latter case, the power supply unit is free to move, but the weight of the power supply unit is increased in proportion to the weight of the battery, the volume of the power supply unit is increased, and, for charging, the power supply unit must be directly connected to a power cable or must be coupled to a charging holder (not shown) that supplies power for a predetermined time.

The charging holder may be connected to the display device through a terminal exposed to the outside, or the battery mounted in the power supply unit may be charged in a wireless manner when the power supply unit approaches the charging holder.

The remote controller 200 may transmit user input to the user input interface unit 173. To this end, the remote controller 200 may use Bluetooth communication, radio frequency (RF) communication, infrared radiation communication, ultra-wideband (UWB) communication, or ZigBee communication. In addition, the remote controller 200 may receive an image, audio, or data signal output from the user input interface unit 173 so as to be displayed thereon or audibly output therefrom.

Meanwhile, the display device 100 may be a stationary or movable digital broadcast receiver capable of receiving a digital broadcast.

Meanwhile, the block diagram of the display device 100 shown in FIG. 1 is for an embodiment of the present disclosure, and elements of the block diagram may be integrated, added, or omitted depending on specifications of an actually implemented display device 100.

That is, two or more elements may be integrated into one element, or one element may be divided into two or more elements, as needed. In addition, the function performed by each block is for describing the embodiment of the present disclosure, and the specific operations and components thereof do not limit the scope of rights of the present disclosure.

Figure 2:
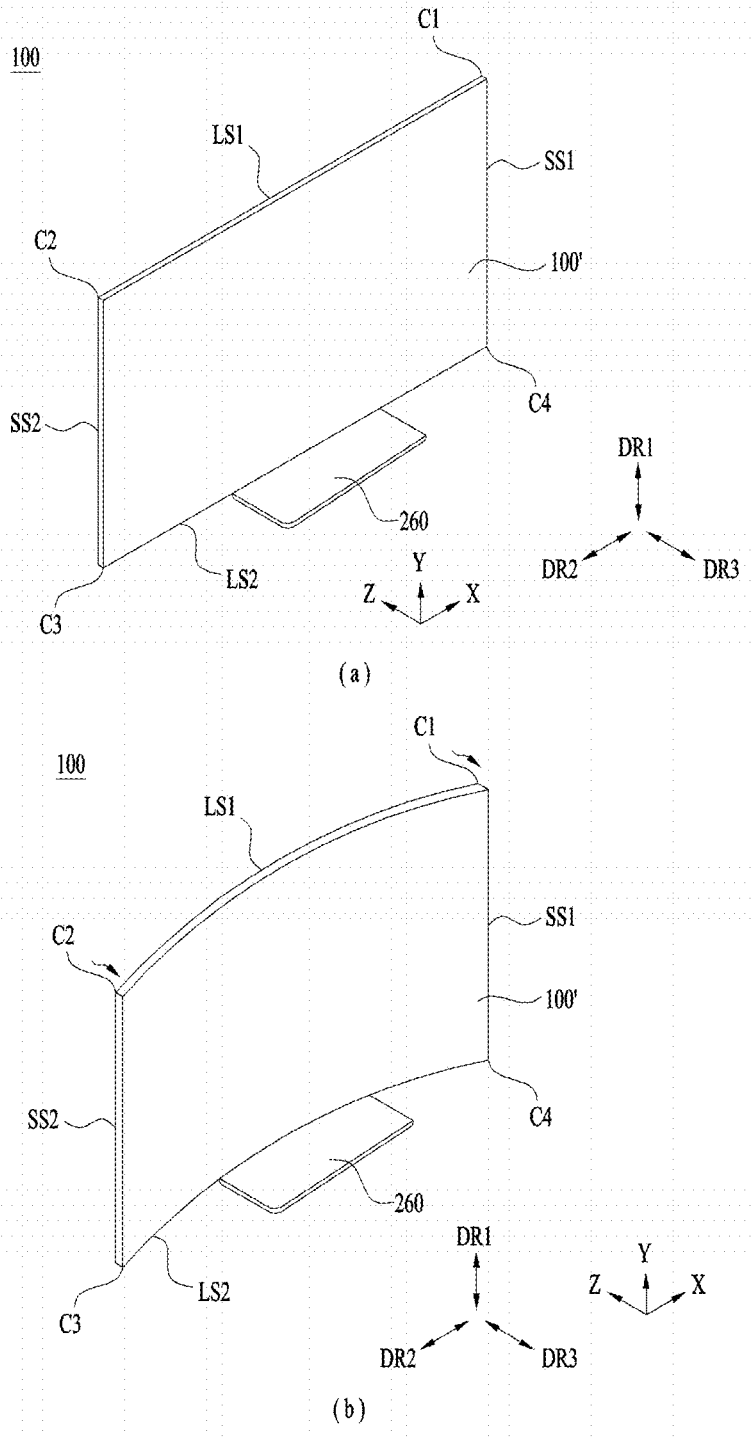
FIG. 2 is a perspective view showing an example of the display device according to the present disclosure.

FIG. 2 is a front perspective view showing an example of the display device.

Referring to FIG. 2, the display device 100 may have a rectangular shape including a first long side LS1, a second long side LS2 opposite the first long side LS1, a first short side SS1 adjacent to the first long side LS1 and the second long side LS2, and a second short side SS2 opposite the first short side SS1.

Here, the area of the first short side SS1 may be referred to as a first side area, the area of the second short side SS2 may be referred to as a second side area opposite the first side area, the area of the first long side LS1 may be referred to as a third side area adjacent to the first side area and the second side area and located between the first side area and the second side area, and the area of the second long side LS2 may be referred to as a fourth side area adjacent to the first side area and the second side area, located between the first side area and the second side area, and opposite the third side area.

In addition, the lengths of the first and second long sides LS1 and LS2 are shown and described as being greater than the lengths of the first and second short sides SS1 and SS2, for convenience of description; however, the lengths of the first and second long sides LS1 and LS2 may be approximately equal to the lengths of the first and second short sides SS1 and SS2.

Also, in the following description, a first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

From a different point of view, the side of the display device 100 on which a picture is displayed may be referred to as a front side or a front surface. When the display device 100 displays the picture, the side of the display device 100 from which the picture cannot be viewed may be referred to as a rear side or a rear surface. When viewing the display device 100 from the front side or the front surface, the side of the first long side LS1 may be referred to as an upper side or an upper surface. In the same manner, the side of the second long side LS2 may be referred to as a lower side or a lower surface. In the same manner, the side of the first short side SS1 may be referred to as a right side or a right surface, and the side of the second short side SS2 may be referred to as a left side or a left surface.

In addition, the first long side LS1, the second long side LS2, the first short side SS1, and the second short side SS2 may be referred to edges 351 of the display device 100. In addition, points at which the first long side LS1, the second long side LS2, the first short side SS1, and the second short side SS2 are joined to each other may be referred to as corners. For example, a point at which the first long side LS1 and the first short side SS1 are joined to each other may be a first corner C1, a point at which the first long side LS1 and the second short side SS2 are joined to each other may be a second corner C2, a point at which the second short side SS2 and the second long side LS2 are joined to each other may be a third corner C3, and a point at which the second long side LS2 and the first short side SS1 are joined to each other may be a fourth corner C4.

Here, a direction from the first short side SS1 to the second short side SS2 or a direction from the second short side SS2 to the first short side SS1 may be referred to as a leftward-rightward direction LR. A direction from the first long side LS1 to the second long side LS2 or a direction from the second long side LS2 to the first long side LS1 may be referred to as a vertical direction UD.

The display device 100 according to the present disclosure may use LED or OLED rather than liquid crystal, and thus a shape of the display module 150 may be changed as shown in (a) or (b) of FIG. 2. In other words, the shape of the display module 150 may be changed within a certain range by omitting a backlight unit, and the display device 100 curved as shown in (b) of FIG. 2 may be implemented using the characteristics.

The display device 100 according to the present disclosure may be a variable display device that allows a user to adjust a curvature depending on the situation rather than a curved display that is fixed in a curved state. The display device 100 according to the present disclosure may further include a curvature adjuster for changing a curvature of a main body 100' including the display module 150.

Figure 3:
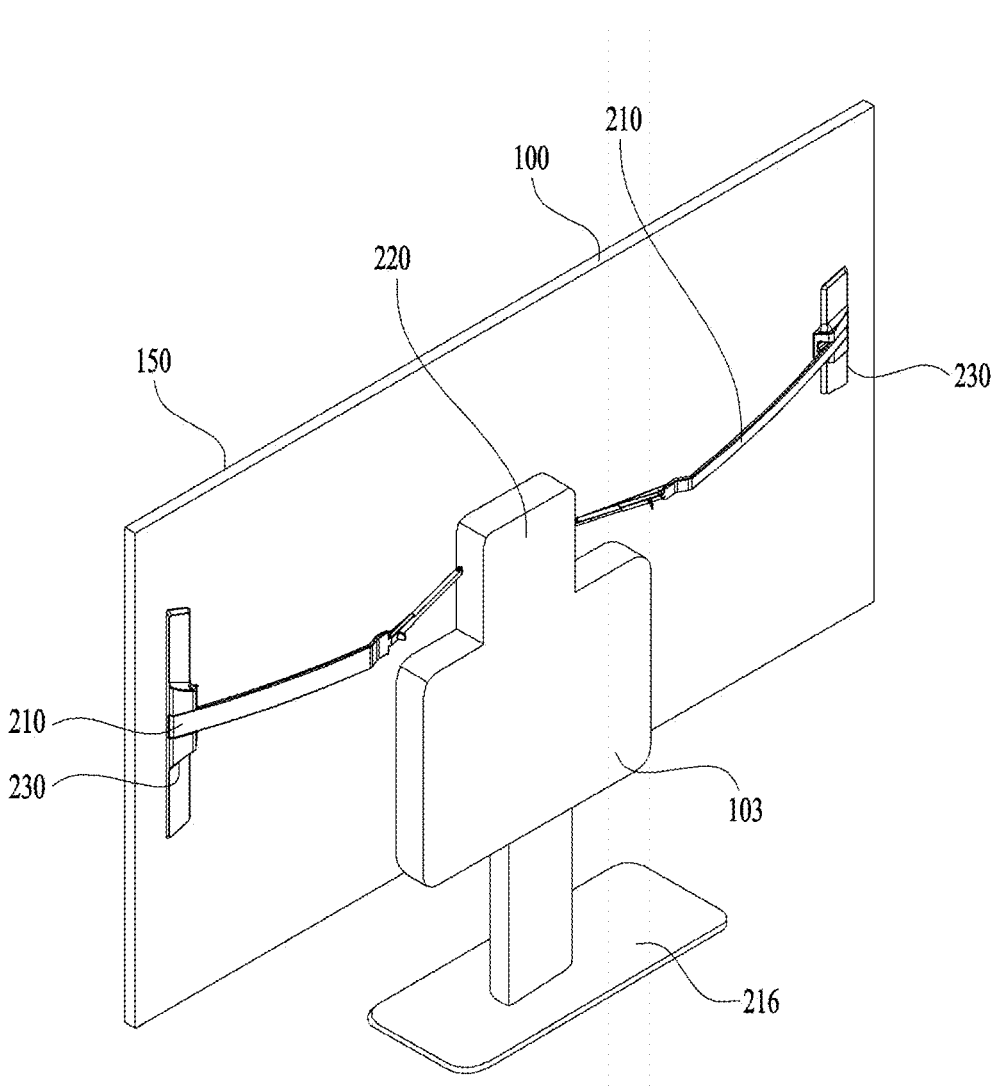
FIG. 3 is a bottom view of a display device.
Figure 4:
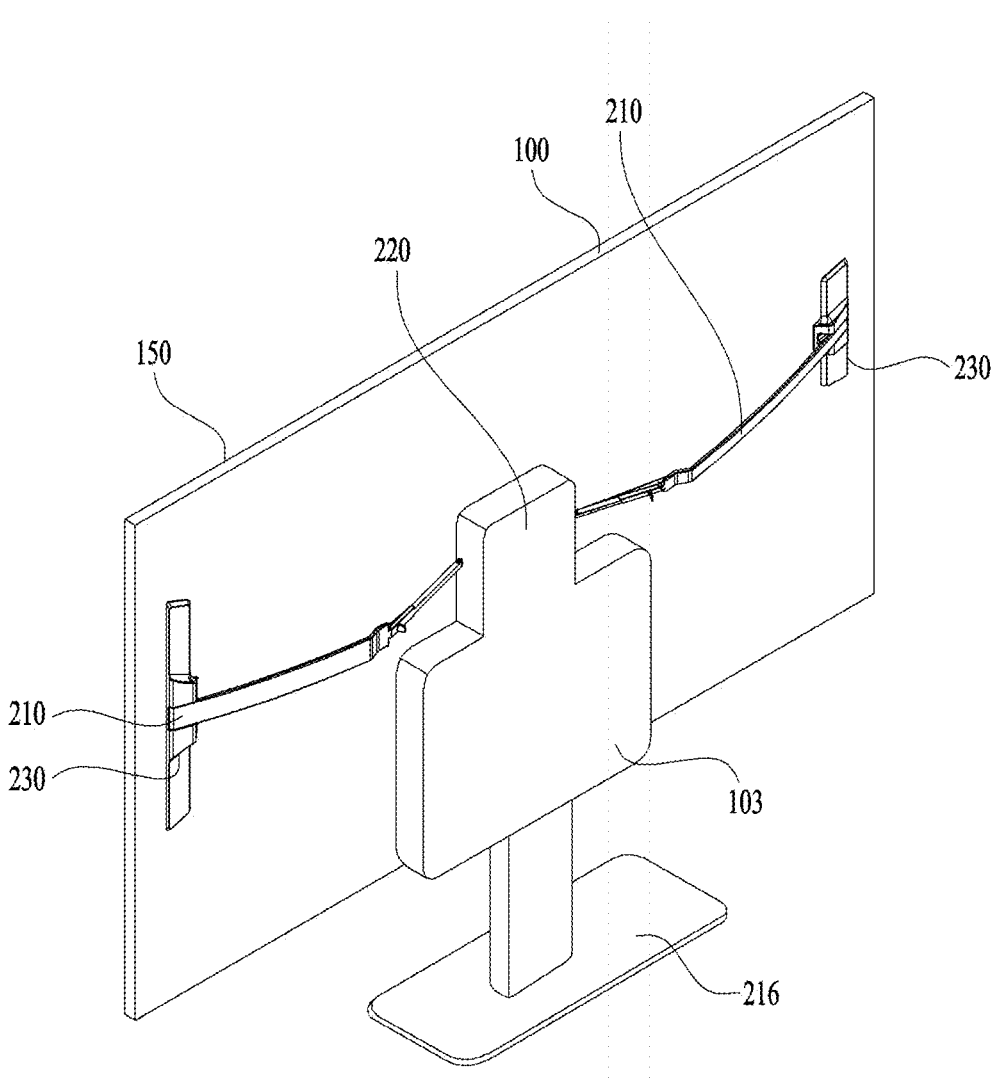
FIG. 4 is an exploded perspective view of a display device.

FIG. 3 is a bottom view of the display device 100, and FIG. 4 is an exploded perspective view of the display device 100. Referring to FIGS. 3 and 4, the display device 100 may include the main body 100', a stand 260 for mounting the main body 100' on the floor, a controller 180, and curvature adjusters 210, 220, and 230.

The main body 100' including the display module 150 may include a cover bottom 102 that covers a rear surface of the display module 150 configured to output an image. The main body 100' may further include a heat dissipation structure to discharge heat generated from the display module 150 on an internal surface of a back cover 102 and further include a reinforcing material to reinforce rigidity.

The back cover 102 covers the rear surface of the display module 150, reinforces the rigidity of the display module 150, and protects the rear surface of the display module 150. In particular, the back cover 102 may cover a drive integrated circuit (IC) of a display extending toward the rear surface of the display module 150. A main board may be mounted on the rear surface of the cover bottom 102 as a controller to control the display module 150, and a hole may be formed in the cover bottom 102 to connect the main board and the drive IC of the display module 150.

A separate bracket 1025 may be further provided such that the controller 180 such as a main board is mounted. In the display device 100 according to the present disclosure, a curvature adjuster that changes the curvature of the main body 100 in addition to the controller that controls the display module 150 may be further mounted on the rear surface of the cover bottom 102.

The curvature adjuster may further include a pair of links 210, a bending module 220 located at the center of the display device 100, and a pair of link brackets 230 located between the other end of the pair of links 210 and the cover bottom 102.

Figure 5:
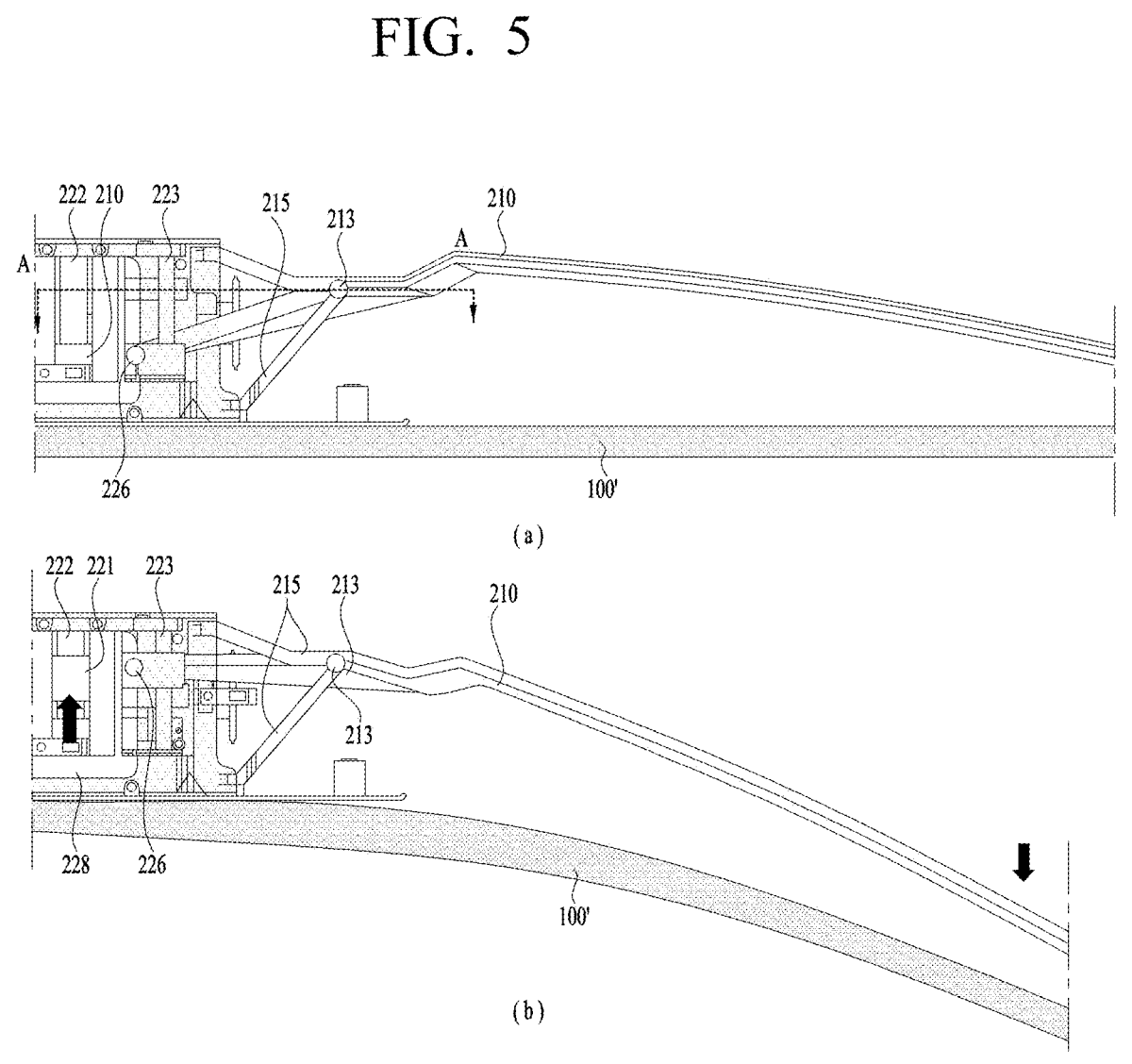

FIG. 5 is a plan view of the display device 100 viewed from the above according to the present disclosure. As shown in (a) and (b) of FIG. 5, a curvature of the display device 100 may be changed according to an angle formed by the pair of links 210. The angle of the pair of links 210 may be adjusted according to a change in position of a moving block 221 of the bending module 220.

The other end of the pair of links 210 may be slidably coupled to the link brackets 230. When the other end of the pair of links 210 are fixed to the link brackets 230, a curvature of the display module 150 may be large at an end thereof, making it difficult to implement a smooth curved surface.

Therefore, when the bending module 220 adjusts an angle of the pair of links 210, the other end of the links 210 slide on the link brackets 230 accordingly, thereby implementing a smooth curved surface of the display module 150.

Figure 6:
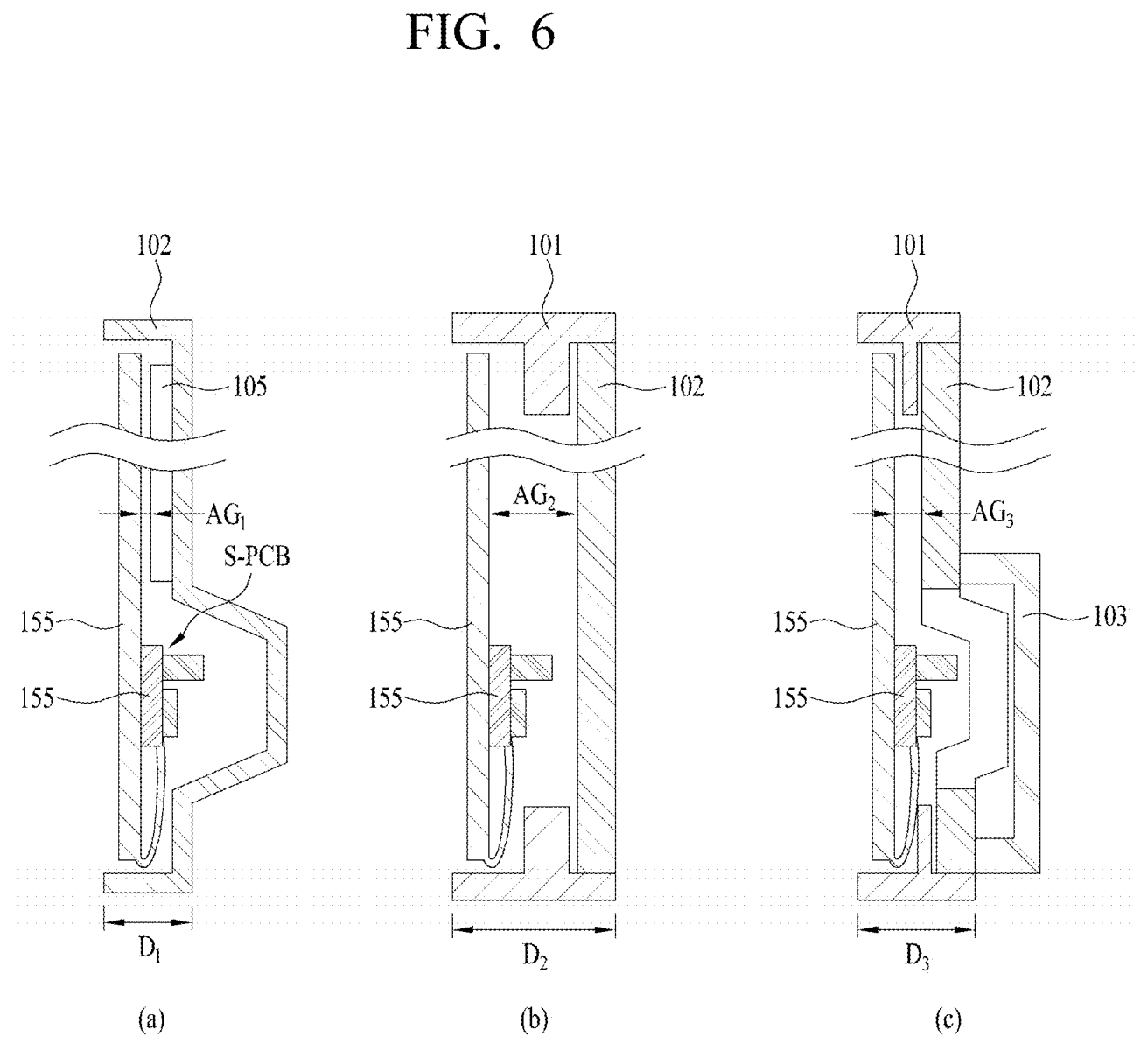

The bending module 220 may include the moving block 221 that is connected to one end of the link 210 and moveable in forward and backward directions, a guide shaft 222 that guides the moving block 221 to move forward and backward without moving left and right, and a module bracket 228 accommodating the bending module 220 therein (refer to FIG. 6).

The link 210 is rotatably coupled to a link fixing portion 215 extending from the bending module 220. The link 210 may rotate around the link fixing portion 213 fastened to the link fixing portion 215, and one end and the other end of the link 210 may move in opposite directions.

When a user pulls horizontal ends SS1 and SS2 of the main body 100' in a direction toward a front surface, the bending module 220 may move the other end of the link 210 located at the horizontal ends SS1 and SS2 of the main body 100', and the link 210 may rotates around the link fixing portion 213 and one end of the link 210 may move in a direction toward a rear surface.

Conversely, when the user pushes the horizontal ends SS1 and SS2 of the main body 100' toward the rear surface to use the display device as a plane shape again, the other end of the link 210 may move toward the rear surface and one end of the link 210 may move toward the front surface. A position of the link 210 at which the link fixing portion 213 is coupled may be located closer to one end than the other end, and a moving distance of one end is shorter than a moving distance of the other end.

As described above, the user may manually change a curvature of the display device 100 by applying force to the horizontal ends SS1 and SS2 of the main body 100'. In this case, the pair of links 210 are synchronized with each other through the bending module 220 and move simultaneously, and thus when the user pulls or presses one side SS1 of the main body 100, the other side SS2 may also move simultaneously.

However, in a manual driving method, the user applies force directly to the display module 150 and there is a risk of damage, and thus the bending module 220 may include a motor to change a curvature of the display module 150.

For example, the guide shaft 222 may be in the form of a spiral, and a spiral groove corresponding to the spiral of the guide shaft 222 may be formed on the moving block 221. When the motor rotates the guide shaft 222, the moving block 221 may move forward and backward.

When the moving block 221 of the bending module 220 moves toward the rear surface, one end of the link 210 coupled to the moving block 221 moves toward the rear surface, and the other end of the link 210 moves toward the front to change an angle of pair of links 210. The bending module 220 may induce a change in the angle of the links 210, and the display module 150 may be switched to a bending state or back to a flat state.

The display device 100 may further include a back cover 103 covering the bending module 220 and the controller and may further include the stand 260 for mounting the main body 100' of the display device 100 on the floor. The display device 100 may further include a wall bracket to be installed on a wall instead of the stand 260, and the stand 260 and the wall bracket may be coupled to the back cover 103.

FIG. 6 is a cross-sectional view of the conventional display device 100. (a) of FIG. 6 is a cross-sectional view of the conventional display device 100 in a flat form. Considering proportions in the drawing, the middle portion is omitted and only the top and bottom are shown.

The display module 150 may include a drive IC 155 that transmits a signal to each pixel to control each pixel and may be connected to the drive IC 155 through a flexible substrate. To reduce the size of a bezel, the drive IC 155 may be located on the rear surface of the display module 150 and the display module 150 and the drive IC 155 may be connected to each other using the flexible substrate.

The drive IC 155 is generally located on a lower rear surface of the display module 150 and includes ICs, and thus protrudes from the rear surface of the display module 150.

Therefore, as shown in (a) of FIG. 6, only a portion of the cover bottom 102, which corresponds to the drive IC 155, may protrude toward the rear surface and extend toward the front surface from an end of the cover bottom 102, and thus a middle cabinet 101 (refer to FIG. 7) covering a side circumference may be omitted.

A gap between the display module 150 and the cover bottom 102 is narrow, making it relatively easy to dissipate heat. However, to dissipate heat from the display module 150 more effectively, a heat dissipation member 105 may be located between the display module 150 and the cover bottom 102.

However, as shown in (a) of FIG. 6, it is difficult to bend and deform the cover bottom 102 in which a rear surface and a lateral surface are connected to each other, and thus it is not possible to implement the bendable display device 100. A protrusion is formed on the rear surface of the cover bottom

102 to cover the drive IC, making it difficult to implement a neat design without unnecessary elements on the rear surface.

In the display device 100 having the same design as (b) of FIG. 6, the cover bottom 102 may be located toward the rear surface up to the protruding portion due to the drive IC 155 to implement a flat rear surface. The middle cabinet 101 that is moved to implement the flat rear surface to surround a lateral surface may be separately provided to bend and deform the main body 100'.

However, a separation distance AG2 between the display module 150 and the cover bottom 102 is wider than a separation distance AG1 in the embodiment of (a) of FIG. 6, and thus there is a problem in that it is difficult to dissipate heat from the display module 150.

To dissipate heat, a heat source with high thermal conductivity, such as metal, needs to be in close contact with a member or positioned close to the member. However, when a gap therebetween is large, heat is trapped in air in the gap, making it difficult to dissipate heat. When heat dissipation is not performed smoothly, the temperature of the display device 100 may rise, which may cause product failure.

As in the embodiment of (a) of FIG. 6, a heat conductive member 105 for heat dissipation may be added between the display module 150 and the cover bottom 102, but a gap between the display module 150 and the cover bottom 102 is large, and thus there is a problem with increased material costs and increased weight. A heat conduction distance is long, and thus the heat dissipation efficiency is not high, and bending is difficult due to the thickness.

To implement the bendable display device 100, a member that is thinner than the cover bottom 102 of the display device 100 with a flat structure may be used, but there is a problem in that the rigidity of the display device 100 due to the cover bottom 102.

In particular, the display device 100 needs to pass a corner bending test in which cracks occur by applying a certain force to a corner because a corner of the display module 150 is the most vulnerable. When the thickness of the cover bottom 102 is small, cracks may occur at low load during the corner bending test, and the product may not satisfy the quality standards.

(c) of FIG. 6 shows an embodiment derived by combining the configurations of (a) and (b) of FIG. 6. The middle cabinet 101 used in the embodiment of (b) of FIG. 6 is applied, and an upper portion may be configured such that a gap between the display module 150 and the cover bottom 102 is narrow as shown in (a) of FIG. 6 (AG3<AG2).

The cover bottom 102 in a lower portion corresponding to the drive IC 155 protrudes toward the rear surface. As in the embodiment of (a) of FIG. 6, the protruding portion may be exposed to the rear surface as in the embodiment of (a) of FIG. 6, or may be covered with a back cover.

In the embodiment of (c) of FIG. 6, when the thin cover bottom 102 is used to enable bending, the problem in terms of rigidity remains as in the embodiment of (b) of FIG. 6. As in (a) of FIG. 6, it is difficult to implement a flat rear surface, and the thickness of the middle cabinet 101 is thin, making it difficult to manufacture and raising the risk of damage.

Figure 7:
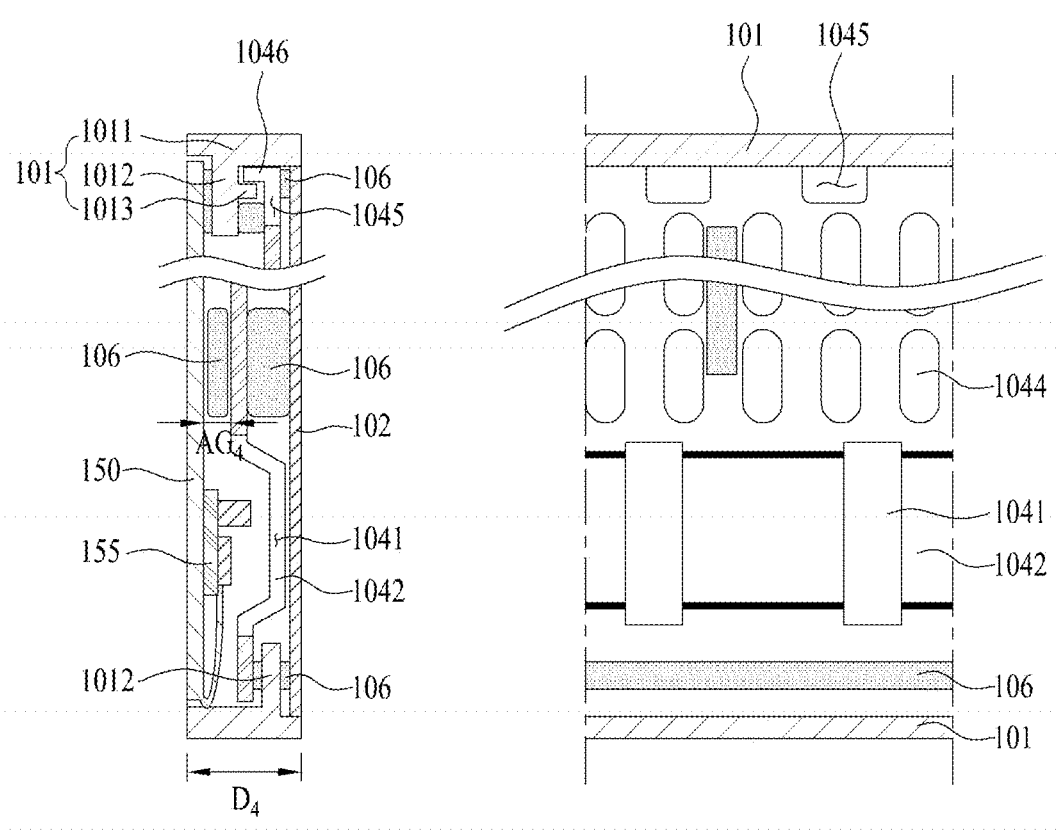
FIG. 7 is a cross-sectional view of a conventional display device.
Figure 8:
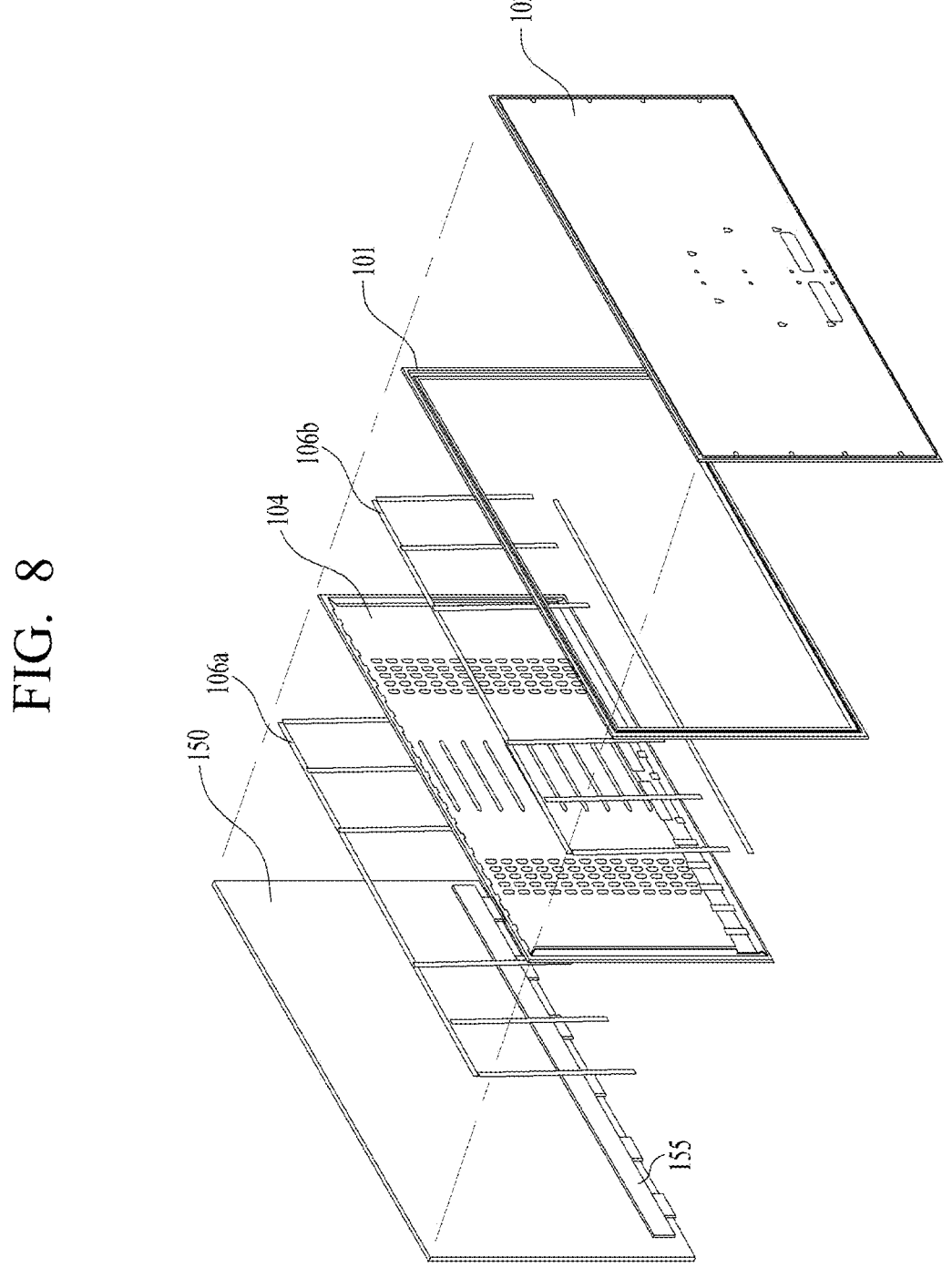
FIG. 8 is a diagram showing an inner sheet of a display device.

FIG. 7 is a cross-sectional view of an example of the display device 100 and a diagram showing a portion of an inner sheet 104. FIG. 8 is an exploded diagram of the main body 100' of the display device 100.

The display device 100 according to the present disclosure may further includes the inner sheet 104 between the cover bottom 102 and the display module 150 to resolve heat dissipation and rigidity problems and simultaneously implement a flat rear surface structure.

To implement the bendable display device 100, the display module 150 uses a device without a backlight, such as a bendable LED or OLED, and the structures 102 and 104 that cover the rear surface of the display module 150 need to also be bent.

To be implemented in a bendable form, the display device 100 according to the present disclosure may include the middle cabinet 101 covering the lateral side and the cover bottom 102 covering the rear surface as separate members, and the inner sheet 104 may be further provided.

The display device 100 according to the present disclosure includes the display module 150 outputting an image, the inner sheet 104 located on the rear surface of the display module 150, and the cover bottom 102 constituting the rear surface of the main body 100' of the display device 100. Provided is the middle cabinet 101 located around lateral surfaces of the display module 150, the inner sheet 104, and the cover bottom 102 and defining an outer appearance the lateral surface of the main body 100'.

As shown in (a) of FIG. 7, the inner sheet 104 is located adjacent to a rear side of the display module 150, thereby reducing the size of a gap AG4 to prevent heat stagnation. It is advantageous in terms of heat dissipation to arrange a gap between the inner sheet 104 and the display module 150 to be smaller than a gap between the inner sheet 104 and the cover bottom 102.

The inner sheet 104 may also include a metal material with high thermal conductivity to achieve a heat dissipation effect.

A first region 1042, which corresponds to the drive IC 155 of the inner sheet 104, protrudes toward the rear surface to avoid interference with the drive IC 155. Instead, in the display device 100 according to the present disclosure, the cover bottom 102 defines a flat surface and covers the inner sheet 104, and thus a curve of the first region 1042 of the inner sheet 104 does not affect the exterior design.

Figure 9:
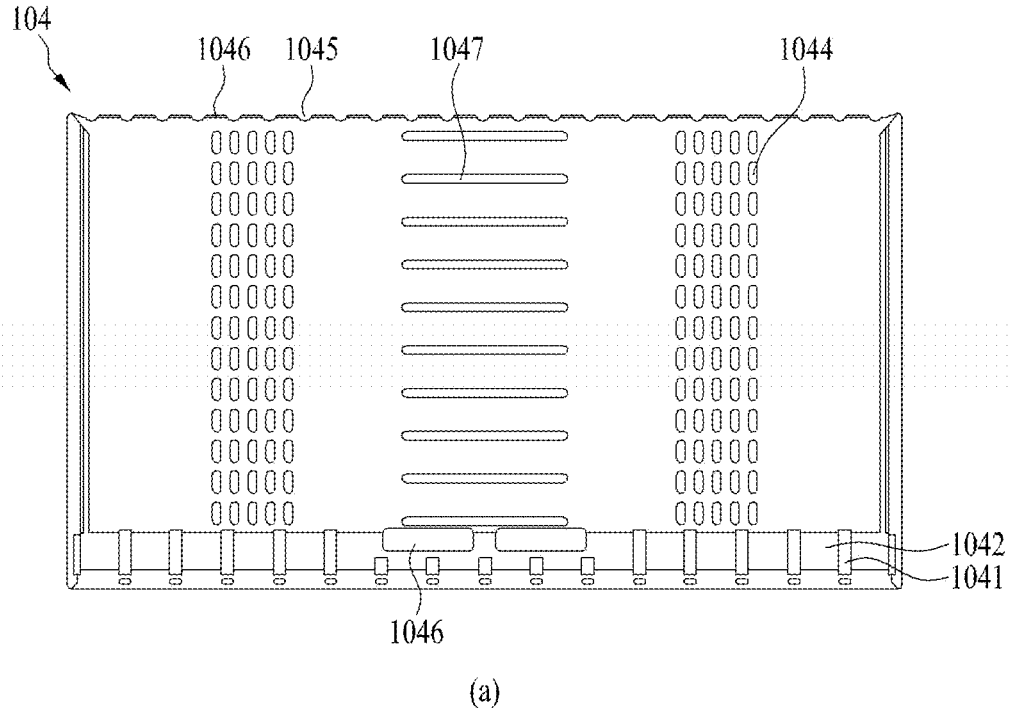
FIGS. 9 to 11 are cross-sectional views showing a display device according to various embodiments.
Figure 9:
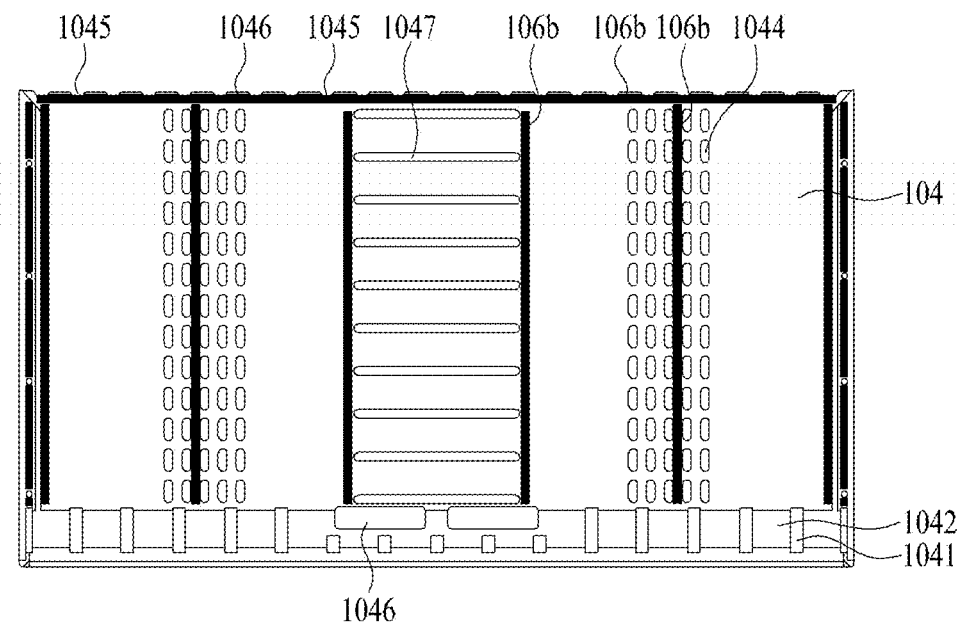

The first region 1042 has a problem that when a curve is formed in the first region 1042, the rigidity increases and bending is difficult. As shown in FIG. 9, when a plurality of first holes 1041 spaced apart in a horizontal direction are formed in the first region 1042, the first holes 1041 are spread corresponding to a curvature of the main body 100', and the inner sheet 104 may be bent.

The members 150, 101, 102, and 104 may be attached using a double-sided adhesive tape 106. The members 150, 101, 102, and 104 may be partially fastened using a fastener such as a screw, but the use of fasteners may be limited to implement the display device 100 with a thin and minimal fastener visible to the outside.

The display module 150 and the inner sheet 104 are light in weight, and thus may remain attached without being separated from each other due to the limited number of fasteners and the adhesive strength of the adhesive tape 106.

The adhesive tape 106 is located between the display module 150 and the inner sheet 104 and between the inner sheet 104 and the cover bottom 102, and when the curvature is changed, the adhesive tape 106 has a certain elasticity, and accordingly, slip between members due to a curvature radial difference may be compensated for.

When the adhesive tape 106 extends long in a horizontal direction, errors due to slip accumulate and the amount of deformation increases at an end, and thus the adhesive tape 106 may be used as long as possible in a vertical direction as shown in FIG. 6.

The adhesive tape 106 located on the front and rear surfaces of the inner sheet 104 may vary depending on a separation distance between the inner sheet 104 and the display module 150 and a separation distance between the inner sheet 104 and the cover bottom 102.

As shown in (a) of FIG. 7, the inner sheet 104 may be located inclined toward the display module 150, except for a position in which the drive IC 155 is located. Accordingly, a thickness of the first adhesive tape 106 located on the front surface of the inner sheet 104 may be smaller than a thickness of the second adhesive tape 106 located on the rear surface.

FIG. 9 is a view showing the inner sheet 104 of the display device 100, (a) of FIG. 9 shows the inner sheet 104 before the adhesive tape 106 is attached, and (b) of FIG. 9 shows a state in which the adhesive tape 106 is attached. The inner sheet 104 according to the present disclosure may be provided using a material that is rigid yet lightweight, such as aluminum, thereby ensuring rigidity.

When the thickness of the cover bottom 102 is increased to ensure rigidity, bending is difficult, but when the structure of the rear surface of the display includes two sheets of the inner sheet 104 and the cover bottom 102 as in the present disclosure, bending and deformation is achieved while ensuring rigidity.

The inner sheet 104 and the cover bottom 102 are attached using the elastic adhesive tape 106, and thus slip occurs within a certain range during bending and the inner sheet 104 and the cover bottom 102 may be easily bent.

When the display device 100 is bent, deformation increases toward left and right ends around a horizontal central portion, and thus a stand for mounting a circuit board as the controller 180 or the bending module 220 and the display device 100 for bending or deformation may be coupled to the central portion.

In this case, support force may be increased by fastening the fastener connecting the controller 180 and the bending module 220 to the inner sheet 104 to pass through the cover bottom 102.

A bead 1047 may be formed to increase the rigidity of the second area located at the horizontal center of the inner sheet 104. The bead 1047 may increase the rigidity of the inner sheet 104 by pressing and processing a plate-shaped member, but when exposed to the outside, the bead 1047 becomes a design inhibitor. The inner sheet 104 is covered by the cover bottom 102, and thus molding the bead 1047 does not affect a design.

The left and right ends of the inner sheet 104, which have little or no deformation, may be subjected to folding processing to reinforce rigidity. The folded portion may be fastened to the cover bottom 102 by using screws or the like, and the inner sheet 104 in the folded portion becomes thicker, and thus the adhesive tape 106 may be used thinner than other areas.

The left and right portions of the center (second region) in the horizontal direction of the inner sheet 104 are portions in which deformation occurs during bending. A plurality of second holes 1044 may be provided to compensate for a difference in length due to a difference in curvature radius between the display module 150 and the cover bottom 102 during bending.

The second hole 1044 may be located uniformly above the first region 1042 such that the entire area of the inner sheet 104 is deformed to be balanced. The second hole 1044 may be formed evenly in a vertical direction, except for the first region 1042 in which the first holes 1041 are already formed. A plurality of the second holes 1044 may be arranged in a horizontal direction to sufficiently accommodate deformation in the horizontal direction.

An area in which the second hole 1044 is formed in the horizontal direction may vary depending on the size and degree of bending of the display device 100. The second hole 1044 may be arranged symmetrically on the left and right such that the left and right deformations are balanced.

Provided may be an opening 1046 through which a cable for connecting the drive IC 155 located on the front surface of the first region 1042 to the controller located on the rear surface of the cover bottom 102 passes, and the opening 1046 may be located at the center. The opening may be provided in the same position as in the cover bottom 102, and may be connected to a controller mounted on the rear surface of the cover bottom 102.

When a member having rigidity, such as metal, is used, damage and plastic deformation may occur during bending and deforming, and accordingly, the middle cabinet 101 may include an injection molded product to be deformed within a predetermined range.

The middle cabinet 101 may include an exposed portion 1011 covering a side perimeter and a fastener 1012 extending inside. The fastener 1012 may be a member that is coupled to the inner sheet 104 and the cover bottom 102 to fix the middle cabinet 101, and may be located between the inner sheet 104 and the cover bottom 102 or in front of the inner sheet 104.

The fastener 1012, the inner sheet 104, and the cover bottom 102 may be fastened using the adhesive tape 106, and may be fastened by molding a first hook 1013 located at an end of the fastener 1012 and a second hook 1046 by bending an end of the inner sheet 104 to increase fastening force. When the second hook 1046 is continuous, the second hook 1046 interferes with bending of the inner sheet 104, and thus a slit may be formed at the top to facilitate bending.

As shown in (a) of FIG. 7, the upper fastener 1012 may be located in the front of the inner sheet 104, and the lower fastener 1012 may be located between the inner sheet 104 and the cover bottom 102. When the fastener 1012 is located in the front of the inner sheet 104, the cover bottom 102 and the adhesive tape 106 exposed through the upper slit formed in the inner sheet 104 may be fastened to ensure the fastening force with the cover bottom 102.

However, when the fastener 1012 is located on the front of the inner sheet 104 as shown in (a) of FIG. 7, both the inner sheet 104 and the cover bottom 102 include metal, and thus a thermal expansion coefficient is high. When the ambient temperature changes, if both the inner sheet 104 and the cover bottom 102 expand, the adhesive tape 106 attached between the fastener 1012, and the inner sheet 104 and the cover bottom 102 may be separated.

Figure 10:
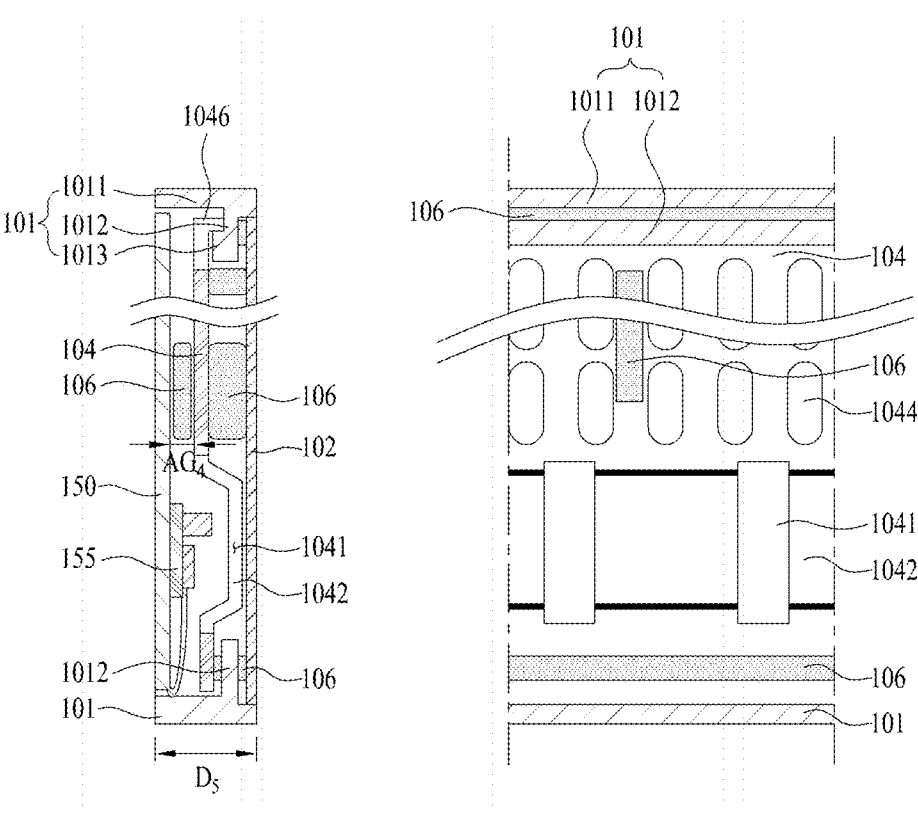
Figure 11:
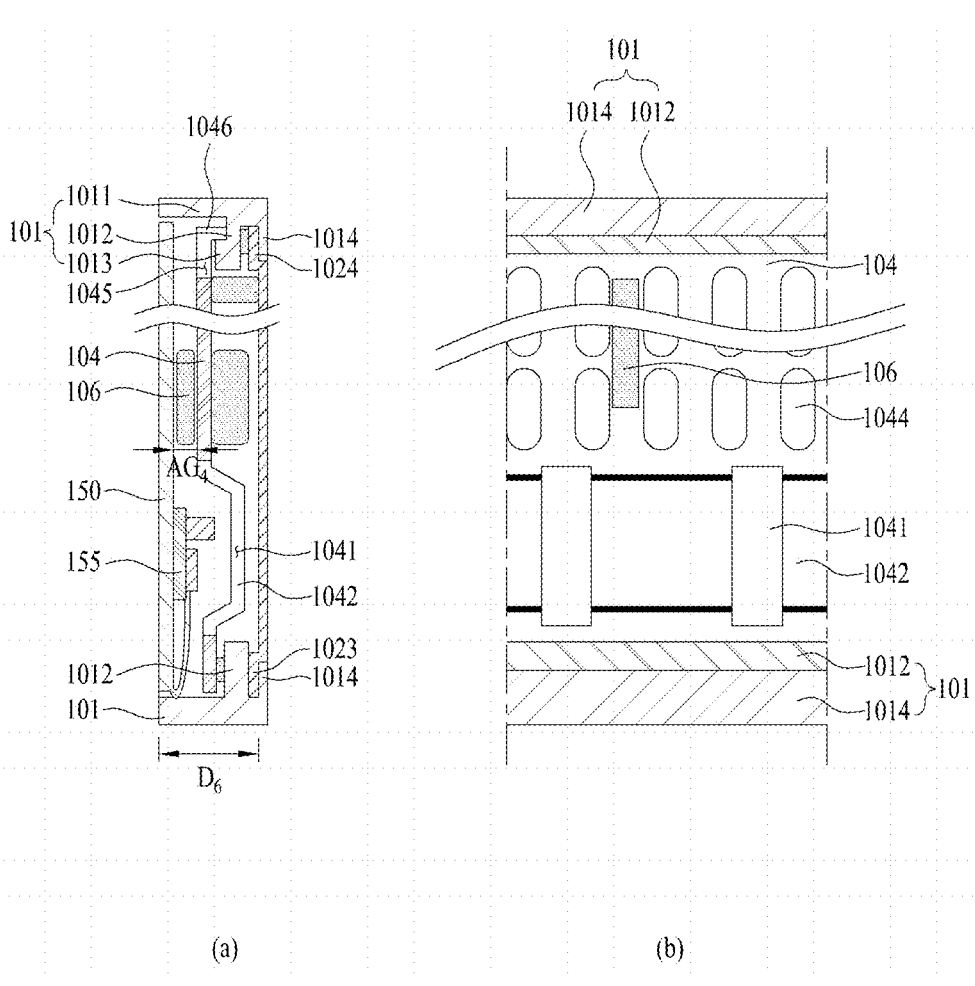

FIGS. 10 and 11 are diagrams showing the display device 100 according to another embodiment. To resolve the above-described problem, the fastener 1012 may be located between the inner sheet 104 and the cover bottom 102 as shown in FIG. 10. A symmetrical sandwich structure may be configured by locating the fastener 1012 including an injection molded material between the inner sheet 104 including metal and the cover bottom 102. Due to the symmetrical structure, severe deformation of only one side due to thermal expansion does not occur, preventing the adhesive tape 106 from being separated.

For greater fastening force, as shown in FIG. 11, a third hook 1014 surrounding the cover bottom 102 may be formed at a rear end of the exposed portion 1011 of the middle cabinet 101. The third hook is a portion exposed to the rear surface of the main body 100′ and may have a continuous surface, and an end of the cover bottom 102 is bent (a fourth hook 1024) toward the front end of the cover bottom 102 and is located between the third hook 1014 and the fastener 1012, and thus the cover bottom 102 and the rear surface may define the same plane.

In this case, considering plastic deformation of the cover bottom 102, a slit may be formed with the bent fourth hook 1024, and a slit 1045 in the fourth hook 1024 is covered by the third hook 1014 and is not exposed to the outside.

As described above, in the display device 100 according to the present disclosure, the display module 150 may be deformed into a flat state or a bent state, and thus a user may use the display device 100 in a desired form.

The usability of the display device 100 may be improved by eliminating irregular bending of the display module 150 that occurs during bending and reducing noise caused by friction between members.

Durability may be improved using a material for minimizing wear due to friction that occurs during bending. The above detailed description should not be construed as being limitative in all terms, but should be considered as being illustrative. The scope of the present disclosure should be determined by reasonable analysis of the accompanying claims, and all changes in the equivalent range of the present disclosure are included in the scope of the present disclosure.

The invention claimed is:

1. A display device comprising:
a display module configured to output an image;
an inner sheet located to form front gaps relative to a rear surface of the display module, and having a first region located relative to a bottom of the inner sheet, and a second region and a third region located above the first region, wherein the first region includes a planar portion, a first angled portion extending from one end of the planar portion, and a second angled portion extending from another end of the planar portion;
a drive integrated circuit (IC) coupled to the display module;
a cover bottom located to form rear gaps on a rear surface of the inner sheet; and
a middle cabinet covering perimeters of the display module, the inner sheet, and the cover bottom to form a lateral outer appearance,
wherein the first region of the inner sheet protrudes toward a rear side and includes a plurality of first holes extending in a vertical direction and spaced apart from each other in a horizontal direction, and
wherein the front gaps include:
a first front gap formed between the display module and the first region of the inner sheet, wherein the first front gap is sized to permit positioning of the drive IC,
a second front gap formed between the display module and the second region of the inner sheet, and
a third front gap formed between the display module and the third region of the inner sheet,
wherein the first front gap is larger than the second front gap and the third front gap,
wherein the inner sheet includes a plurality of slits formed in an end of the inner sheet,
wherein the middle cabinet includes an exposed portion exposed around a lateral surface and a fastener extending between the display module and the inner sheet from the exposed portion, and
wherein the display device further includes an adhesive tape located in the plurality of slits and configured to fasten the fastener to the cover bottom.

2. The display device of claim 1, wherein the second and third front gaps are smaller than the rear gaps between the cover bottom and the second and third regions of the inner sheet.

3. The display device of claim 1, wherein the second region is located in a central portion of the inner sheet in the horizontal direction, and wherein the inner sheet includes a plurality of rigid beads individually formed in the second region, and separately extending in the horizontal direction, and spaced apart from each other in the vertical direction.

4. The display device of claim 3, wherein the third region is located between the second region and an end in the horizontal direction, and wherein the inner sheet further includes a plurality of second holes formed in the third region.

5. The display device of claim 1, wherein the middle cabinet includes:

the fastener extending inward from the exposed portion and including a first hook, wherein the inner sheet has an end including a second hook coupled to the first hook.

6. The display device of claim 1, wherein the middle cabinet includes:

the fastener extending inward from the exposed portion, and the fastener is located between the inner sheet and the cover bottom.

7. The display device of claim 6, wherein a front surface of the fastener is coupled to the rear surface of the inner sheet by using the adhesive tape, and a rear surface of the fastener is coupled to a front surface of the cover bottom by using the adhesive tape.

8. The display device of claim 6, wherein the middle cabinet further includes a third hook extending from an end of a rear surface of the exposed portion and covering an end of the cover bottom, and the cover bottom further includes a hook fastener inserted in a front direction at a position corresponding to the third hook.

9. The display device of claim 1, wherein the cover bottom includes a flat surface without an unevenness.

10. The display device of claim 1, wherein the middle cabinet includes an injection molding, and the cover bottom and the inner sheet include aluminum.

11. The display device of claim 1, further comprising:

a bending module located in a center of a rear surface of the cover bottom;

a pair of links having one end coupled to the bending module and extending left and right; and link brackets located at left and right ends of the cover bottom and connected to another end of the pair of links, wherein, when an angle between the pair of links is changed, curvatures of the display module, the inner sheet, and the cover bottom are changed.

12. The display device of claim 1, wherein the display module includes an organic light emitting diode panel.

13. A display device comprising:

a display module configured to output an image;

a drive integrated circuit (IC) located on a rear surface of one end of the display module;

an inner sheet located to form a front gap on the rear surface of the display module;

a cover bottom located to form a rear gap on a rear surface of the inner sheet; and a middle cabinet covering perimeters of the display module, the inner sheet, and the cover bottom to form a lateral outer appearance, wherein the inner sheet includes:

a first region protruding toward a rear surface at a position corresponding to the drive IC;

a plurality of first holes formed in the first region; and a plurality of slits formed in an end of the inner sheet, and the middle cabinet includes an exposed portion exposed around a lateral surface and a fastener extending between the display module and the inner sheet from the exposed portion, and the display device further includes an adhesive tape located in the plurality of slits and configured to fasten the fastener to the cover bottom.

14. A display device comprising:

a display module configured to output an image;

an inner sheet located to form a front gap relative to a rear surface of the display module;

a drive integrated circuit (IC) located between the rear surface of the display module and a front surface of a first region of the inner sheet;

a cover bottom located to form a rear gap on a rear surface of the inner sheet; and a middle cabinet covering perimeters of the display module, the inner sheet, and the cover bottom to form a lateral outer appearance, wherein the inner sheet includes:

a second region located in a central portion of the inner sheet in a horizontal direction;

third regions respectively located between the second region and a respective end of the inner sheet in the horizontal direction;

a plurality of rigid beads individually formed in a curved protrusion shape separately protruding from the inner sheet and being located within the second region; and a plurality of second holes formed in the third regions of the inner sheet and arranged in the horizontal direction and a vertical direction to form a lattice arrangement, wherein the inner sheet includes a plurality of slits formed in an end of the inner sheet, wherein the middle cabinet includes an exposed portion exposed around a lateral surface and a fastener extending between the display module and the inner sheet from the exposed portion, and wherein the display device further includes an adhesive tape located in the plurality of slits and configured to fasten the fastener to the cover bottom.

15. The display device of claim 14, wherein the plurality of rigid beads have a shape extending in the horizontal direction, and spaced apart from each other in the vertical direction.

\* \* \* \* \*